United States Patent [19]
O'Donnell et al.

[11] Patent Number: 5,532,017
[45] Date of Patent: Jul. 2, 1996

[54] MELT RESTRICTED MARSHMALLOW

[75] Inventors: Lisa T. O'Donnell, Cordova, Tenn.; Ralph S. Wirebaugh, Waucanda, Ill.

[73] Assignee: Favorite Brands International, Inc., Lincolnshire, Ill.

[21] Appl. No.: 340,088

[22] Filed: Nov. 14, 1994

[51] Int. Cl.[6] .................... A23G 3/00; A23L 1/05
[52] U.S. Cl. ............................ 426/571; 426/572
[58] Field of Search .................... 426/564, 570, 426/571, 576, 572

[56] References Cited

U.S. PATENT DOCUMENTS

| | | | |
|---|---|---|---|
| 2,847,311 | 8/1958 | Doumak et al. | 99/134 |
| 3,062,661 | 11/1962 | Doumak | 99/134 |
| 3,067,037 | 12/1962 | Herald et al. | 99/139 |
| 3,206,315 | 9/1965 | Anderson et al. | 99/134 |
| 3,607,309 | 9/1971 | Olney et al. | 99/134 A |
| 3,682,659 | 8/1972 | Jurczak et al. | 99/134 A |
| 3,908,032 | 9/1975 | Didelot et al. | 426/660 |
| 3,998,976 | 12/1976 | Pernod et al. | 426/103 |
| 4,120,987 | 10/1978 | Moore | 426/572 |
| 4,189,502 | 2/1980 | Rubenstein | 426/249 |
| 4,323,588 | 4/1982 | Vink et al. | 426/564 |
| 4,861,604 | 8/1989 | Tang et al. | 426/94 |
| 5,035,907 | 7/1991 | Phillips et al. | 426/383 |
| 5,429,830 | 7/1995 | Janovsky et al. | 426/94 |

OTHER PUBLICATIONS

FMC Product Specification Bulletin, 1993.
Sugar Confectionery Manufacture, 1990, Editor, E. B. Jackson, Publisher, Van Nostrand Heinhold, pp. 232–235.
Candy Technology, 1979, Publisher, The Ari Publishing Co., Inc., pp. 83–87.
Staley Mira Gel Brochure, 1987.

*Primary Examiner*—Jeanette Hunter
*Attorney, Agent, or Firm*—Pravel, Hewitt, Kimball & Krieger

[57] ABSTRACT

The present invention is directed to a marshmallow product having melt resistant properties when heated. The marshmallow confection contains corn syrup, sugar, dextrose, water, starch, gelatin, microcrystalline cellulose and a phosphate salt. The marshmallow confection product has a predetermined ratio of corn starch to microcrystalline cellulose to provide the melt resistant properties of the marshmallow confection.

26 Claims, No Drawings

MELT RESTRICTED MARSHMALLOW

FIELD OF THE INVENTION

The present invention is directed to a marshmallow confection product having melt resistant properties.

BACKGROUND OF THE INVENTION

Marshmallow is a well recognized confection which is manufactured by whipping a syrup at temperatures at or above room temperature to produce a light, fluffy, white emulsion of air in the syrup mixture. In a batch process, sugar, glucose, water and other ingredients, such as starch, salt and flavoring agents are heated to form the syrup to which is added a solution of gelatin. This mixture is then placed in an open beater or otherwise agitated to produce a homogeneous aerated mass which is cast or injected into starch molds.

U.S. Pat. No. 2,847,311 to Doumak, et al. discloses a continuous process for producing marshmallow wherein the beaten homogeneous mass is extruded onto a conveyor belt which is coated with starch. The extruded strands of marshmallow are cut into cylinders and additional starch is applied to the cut pieces of marshmallow.

Typical marshmallow products cannot be used in high temperature processes, such as baking, due to their inability to retain identity and texture under elevated temperatures that are standard in baking conditions, i.e., 350° F. for 20 minutes. Upon exposure to heat, marshmallow air cells expand and the gelatin destabilizes causing the air cells to collapse and reducing the marshmallow to a syrupy liquid state that dissolves into the bakery medium. This property has limited the use of marshmallows as a baking ingredient due to loss of product attributes which identify the marshmallow ingredient.

A 1993 FMC product brochure discloses a bakery stable marshmallow (BSM). However, the BSM has large air cells, a short gummy texture, and is very dense.

Accordingly, it would be desirable to provide a marshmallow confection having dual functionalites—a marshmallow which has the appearance and texture of conventional marshmallow and which exhibits melt resistant properties upon baking.

SUMMARY OF THE INVENTION

The present invention is directed to a melt restricted marshmallow product which has the appearance and texture of conventional marshmallow. The marshmallow confection contains corn syrup, sugar, dextrose, water, starch, gelatin, microcrystalline cellulose and a phosphate salt. The marshmallow confection product has a predetermined ratio of starch to microcrystalline cellulose to provide the melt resistant properties of the marshmallow confection.

By "melt restricted marshmallow" we mean an aerated confectionery composition which has the appearance and texture of a conventional marshmallow yet exhibits melt resistant properties at temperatures from 100° F. to 375° F. for a time range of 5–45 minutes.

DETAILED DESCRIPTION OF THE INVENTION

The corn syrup used in the marshmallow confection product of the invention has from about 75% to about 85% solids, has a DE of from about 55 to about 70 and is present in the marshmallow confection product at a level of from about 50% to about 76%. The sugar is present at a level of from about 15% to about 30%. The dextrose is present at a level of from about 4% to about 15%. Added water is present at a level of from about 3% to about 11%. The total water present, both added water and water provided by the components is from about 10% to about 30%. The gelatin is present at a level of from about 1.0% to about 3.5%.

The starch is a cold water swelling granular starch. Starches of this type are known and are commercially available. One such starch is commercially available under the tradename MIRA-GEL™ 463 (A. E. Staley Manufacturing Co.). Starches of this type hydrate in water at ambient temperature, first forming a thick smooth consistency and then setting to a resilient colloidal gel structure. The starch is present at a level of from about 1.5% to about 5%. The starch is preferably corn starch.

Two particularly preferred microcrystalline cellulose products of FMC Corporation are known under the tradenames AVICEL™ RC-591 and AVICEL™ CL-611. RC-591 is a white, water dispersible powder with a particle size such that less than 0.1 percent is retained on a 60-mesh screen, and is known to be made up of 89 parts microcrystalline cellulose and 11 parts sodium carboxymethylcellulose. CL-611 is made up of 85 parts microcrystalline cellulose and 15 parts of sodium carboxymethylcellulose. The microcrystalline cellulose is present at a level of from about 0.5% to about 2.0%.

The phosphate salt is present at a level of from about 0.05% to about 0.15%. The phosphate salt may be any of the emulsifying salts normally used in the manufacture of processed cheese. These include tetrasodium pyrophosphate, sodium hexametaphosphate and trisodium phosphate. All percentages used herein are by weight, based on the weight of the marshmallow product, unless otherwise indicated. The phosphate salt is preferably tetrasodium pyrophosphate. Colors and flavors may also be present in a minor amount.

The density of the restictied melt marshmallow was determined by liquid displacement at 22° C. using ethylene glycol. The marshmallow of the instant invention has a density of <1.0 g/cc. Preferably, the marshmallow has a density of <0.50 g/cc. The restricted melt marshmallow has a texture of <100 g-force as measured with a 3 mm diameter blunt probe at 2 mm/sec. to a depth of 6 mm. Preferably, the marshmallow has a texture of <72 g-force. Texture may be determine by any firmness measuring device which is normally used in the food industry such as TA-TX2 Texture Analyzer and the Instron Universal Texture Instrument.

It is an important feature of the present invention that a particular ratio of starch to microcrystalline cellulose is provided. While not wishing to be bound by any theory, it is believed that during the whipping of the syrup to provide the whipped marshmallow confection, the gelatin gels around the whipped air cells to stabilize the foam. The starch and microcrystalline cellulose set to a strong resilient gel over a short period of time creating a more stable foam. Upon heating the whipped confection, the gelatin denatures around 180° F. then melts into the medium whereas the starch and microcrystalline cellulose resist flow when exposed to heat thus retaining form and firmness. The ratio of starch to microcrystalline cellulose is preferably in the range of from about 1.5:1.0 to about 3.5:1.0.

In the method of the invention for producing the melt restricted marshmallow confection, the microcrystalline cellulose, the starch and one-fourth of the sugar is dry blended.

One-third of the corn syrup, the balance of the sugar, water and all of the dextrose are introduced into a jacketed kettle along with the dry blend. The mixture is cooked for a period of 1 to 4 hours to reach a temperature of from about 220° F. to about 280° F. The balance of the corn syrup is added and the mixture is cooled to a temperature of from about 150° F. to about 180° F. A gelatin solution is then added to the mixture along with any flavors and the phosphate salt and color. The mixture is cooled to a temperature of from about 140° F. to about 170° F.

The mixture is aerated by transferring the mixture through a continuous automatic beater-mixer and the mixture is further cooled by transferring the mixture through a scraped surface heat exchanger to a temperature of from about 100° F. to about 110° F. The density is standardized to a level of from about 350 to about 400 grams per 1200 ml prior to extrusion. The marshmallow confection product is then extruded into multiple cylindrical strands onto a starch dusted belt. The marshmallow product is cut to appropriate size to provide cylindrical marshmallows. However, the marshmallow product may be shaped or cut to consumer's specifications. The marshmallows are dusted with excess dusting starch in a tumbler.

The following examples further illustrate various features of the invention, but is intended to in no way limit the scope of the invention as set forth in the appended claims.

EXAMPLE 1

The following formulation was used to prepare a marshmallow product with melt resistant properties and having the appearance and texture of conventional marshmallows.

| Ingredient | Weight Percent |
| --- | --- |
| Corn Syrup, 43 BE/63 DE | 58.7 |
| Sugar | 21.6 |
| Dextrose | 7.7 |
| water | 6.0 |
| Corn Starch - MIRA GEL ™ #463 A.E. Staley | 2.4 |
| Gelatin | 2.0 |
| Microcrystalline cellulose-AVICEL FMC | 1.2 |
| Titanium Dioxide | 0.2 |
| Tetrasodium pyrophosphate | 0.1 |
| Flavor | 0.1 |
| Total | 100.0 |

The microcrystalline cellulose, starch and one fourth of the sugar were dry blended in a ribbon blender. The dry blend, water and one third of the corn syrup were introduced into a jacketed kettle. The balance of the sugar and dextrose were added to the kettle. The mixture was cooked for approximately 2 hours to reach a temperature of 252° F. The balance of the corn syrup was added and then the mixture was cooled to a temperature of 160° F. A gelatin solution, the tetrasodium pyrophosphate, colors and flavors were added. The mixture was then cooled to a temperature of 155° F. The mixture was aerated in a continuous beater-mixer and was further cooled in a scraped surface heat exchanger to a temperature of 110° F. The density of the whipped mixture was 387 grams per 1200 ml. The mixture was extruded onto a starch dusted continuous belt and was cut into cylinders having dimensions of 0.5 inches diameter and 0.5 inches high. The cylinders were dusted with excess starch in a tumbler to provide a marshmallow product having 86.96% of the aerated marshmallow mixture and 13.33% of added exterior starch.

When the marshmallow product produced in accordance with the above formulation and method was introduced into various bakery mediums and was baked at various temperatures for an appropriate time (see Table 1), the marshmallow product retained its shape and was perceptible as a marshmallow product in the baked applications.

TABLE 1

| Application | Temp. (°F.) | Time (Min.) |
| --- | --- | --- |
| Brownie | 350 | 19 |
| Seven Layer Bar[1] | 350 | 35 |
| Choc.-Choc. Chip Cookie | 375 | 12 |
| Refrigerated Choc. Chip Cookie Dough | 375 | 11 |
| PBJ - Marshmallow Pie[2] | 375 | 22 |

[1]Seven Lay Bar is a bakery bar created by layering seven confectionery items (e.g., coconut, chocolate chips, peanut butter chips, marshmallow, etc.).
[2]PBJ - Marshmallow Pie refers to a Peanut Butter and Jelly Marshmallow Pie.

EXAMPLE 2

The following bakery stable marshmallow (BSM) formulation is described in a 1993 FMC brochure.

| Ingredient | Weight Percent |
| --- | --- |
| Sugar | 44.48 |
| Water | 15.00 |
| Corn Syrup 63DE | 17.11 |
| Glycerine | 13.11 |
| Modified corn starch - Mira-Set #285 A.E. Staley | 3.40 |
| Corn starch - Mira-Gel #463 | 3.40 |
| Microcrystalline cellulose AVICEL-FMC | 2.00 |
| Carrageenan - Gelcarin GP379 | 0.50 |
| Titanium dioxide | 0.30 |
| Vanilla extract | 0.30 |
| Calcium sulfate | 0.25 |
| Trisodium phosphate | 0.15 |
| Total | 100.0 |

The BSM product, which is made by a batch process, has very large air cells, a short gummy texture, is dull and grayish beige in color and is very dense. This product was used under cupcake baking conditions, i.e., 350° F. for 20 minutes. The BSM product settled to the bottom of the batter and exhibited a shiny, firm, gummy texture.

EXAMPLE 3

The melt restricted marshmallow (MRM) of the instant invention was evaluated against two bakery stable marshmallow (BSM) formulations for density and texture. Density (D) was determined by liquid displacement at 22° C. using ethylene glycol. Table 2 shows the results as measured in grams/cc.

TABLE 2

| | MRM | BSH w/Avicel C1-6111 | BSM w/Avicel RC-591F |
| --- | --- | --- | --- |
| Density (g/cc) | .34 | 1.33 | 1.31 |

The texture was determined with a TA-XT2 Texture Analyzer (Texture Technologies.) The analyzer was fitted with a 3 mm diameter blunt probe. The probe was driven into the individual samples at 2 mm/sec to a depth of 6 mm.

A peak force (g-force) was determined for 10 separate samples of each of the three formulations. Table 3 shows the average peak force (m), the standard deviation (s) and the relative standard deviation (% RSD.)

TABLE 3

| m - (g-force) | 68 | 210 | 134 |
|---|---|---|---|
| s | 3 | 27 | 10 |
| % RSD | 4 | 13 | 7 |

What is claimed is:

1. A melt restricted marshmallow product having heat stability to about 375° F. comprising corn syrup, sugar, dextrose, water, starch, gelatin, microcrystalline cellulose and a phosphate wherein the microcrystalline cellulose is present in the level of from about 0.5% to about 2.0% and the level of starch is present at a level of from about 1.5% to about 5% by weight.

2. A marshmallow product in accordance with claim 1 wherein the corn syrup has from about 75% to about 85% solids, has a DE of from about 55 to about 70 and is present at a level of from about 50% to about 76%.

3. A marshmallow product in accordance with claim 1 wherein the sugar is present at a level of from about 15% to about 30%.

4. A marshmallow product in accordance with claim 1 wherein the dextrose is present at a level of from about 4% to about 15%.

5. A marshmallow product in accordance with claim 1 wherein the water is present at a level of from about 3% to about 11%.

6. A marshmallow product in accordance with claim 1 wherein the starch is a corn starch.

7. A marshmallow product in accordance with claim 1 wherein the gelatin is present at a level of from about 1.0% to about 3.5%.

8. A marshmallow product in accordance with claim 1 wherein the phosphate salt is present at a level of from about 0.05% to about 0.15%.

9. A melt restricted marshmallow product having heat stability to about 375° F. comprising corn syrup, sugar, dextrose, water, starch, gelatin, microcrystalline cellulose and a phosphate wherein the ratio of starch to microcrystalline cellulose is in the range of from about 1.5:1 to about 3.5:1.

10. A marshmallow product in accordance with claim 1 wherein the marshmallow has a density of <1.0 g/cc.

11. A marshmallow product in accordance with claim 10 wherein the marshmallow has a density of <0.50 g/cc.

12. A marshmallow product in accordance with claim 1 wherein the marshmallow has a firmness of <100 g-force as measured with a 3 mm diameter blunt probe at 2 mm/sec to a depth of 6 mm.

13. A marshmallow product in accordance with claim 12 wherein the marshmallow has a firmness of <72 g-force.

14. A marshmallow product in accordance with claim 9 wherein the corn syrup has from about 75% to about 85% solids, has a DE of from about 55 to about 70 and is present at a level of from about 50% to about 76%.

15. A marshmallow product in accordance with claim 9 wherein the sugar is present at a level of from about 15% to about 30%.

16. A marshmallow product in accordance with claim 9 wherein the dextrose is present at a level of from about 4% to about 15%.

17. A marshmallow product in accordance with claim 9 wherein the water is present at a level of from about 3% to about 11%.

18. A marshmallow product in accordance with claim 9 wherein the starch is present at a level of from about 1.5% to about 5%.

19. A marshmallow product in accordance with claim 18 wherein the starch is corn starch.

20. A marshmallow product in accordance with claim 9 wherein the gelatin is present at a level of from about 1.0% to about 3.5%.

21. A marshmallow product in accordance with claim 9 wherein the microcrystalline cellulose is present at a level of from about 0.5% to about 2.0%.

22. A marshmallow product in accordance with claim 9 wherein the phosphate salt is present at a level of from about 0.05% to about 0.15%.

23. A marshmallow product in accordance with claim 9 wherein the marshmallow has a density of <1.0 g/cc.

24. A marshmallow product in accordance with claim 9 wherein the marshmallow has a density of <0.50 g/cc.

25. A marshmallow product in accordance with claim 9 wherein the marshmallow has a firmness of <100 g-force as measured with a 3 mm diameter blunt probe at 2 mm/sec to a depth of 6 mm.

26. A marshmallow product in accordance with claim 9 wherein the marshmallow has a firmness of <72 g-force.

* * * * *